(12) United States Patent
Park et al.

(10) Patent No.: US 8,446,917 B2
(45) Date of Patent: May 21, 2013

(54) METHODS AND APPARATUS FOR EFFICIENTLY COMMUNICATING INFORMATION USING A PROXY

(75) Inventors: Vincent D. Park, Budd Lake, NJ (US); Zhibin Wu, Highland Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 12/474,058

(22) Filed: May 28, 2009

(65) Prior Publication Data

US 2010/0303003 A1 Dec. 2, 2010

(51) Int. Cl.
*H04J 3/16* (2006.01)

(52) U.S. Cl.
USPC .......................................................... 370/466

(58) Field of Classification Search
None
See application file for complete search history.

(56) References Cited

U.S. PATENT DOCUMENTS

| | | | | |
|---|---|---|---|---|
| 6,640,248 | B1 * | 10/2003 | Jorgensen | 709/226 |
| 7,870,267 | B2 * | 1/2011 | Gilfix et al. | 709/227 |
| 2004/0076178 | A1 * | 4/2004 | Botton | 370/466 |
| 2004/0248558 | A1 | 12/2004 | Chandhok | |
| 2008/0294776 | A1 | 11/2008 | Ding | |
| 2009/0086688 | A1 * | 4/2009 | Kvache et al. | 370/338 |

FOREIGN PATENT DOCUMENTS

WO WO02054804 7/2002

OTHER PUBLICATIONS

International Search Report and Written Opinion—PCT/US2010/036337, International Searching Authority—European Patent Office, Nov. 4, 2010.

* cited by examiner

*Primary Examiner* — Raj Jain
(74) *Attorney, Agent, or Firm* — James K. O'Hare

(57) ABSTRACT

Methods for communicating discovery information are described. A module intercepts messages within a device which include a first identifier, e.g., a service, application, device or other identifier which is to be communicated or which is to be monitored for in the case of a device seeking something. A second identifier corresponding to the information to be communicated or item or service being sought is generated. The second identifier is transmitted in the case of an advertisement or monitored for in the case of the device seeking something. Following a second device establishing a communications connection in response to an advertisement, stored information such as all or a portion of the first identifier is transmitted over the established connection. A device seeking an item or service, in response to detecting the second identifier, establishes a connection with the second device. The second identifier maybe shorter than the first identifier.

28 Claims, 11 Drawing Sheets

METHODS AND APPARATUS FOR EFFICIENTLY COMMUNICATING INFORMATION USING A PROXY

FIELD

Various embodiments relate to wireless communications, and more particularly, to methods and apparatus for communicating, e.g., advertising and/or detecting information, e.g. information related to a device, service and/or an application.

BACKGROUND

In wireless systems, it is often desirable to transmit advertisement and/or request information which can be used by other devices to determine whether or not it is desirable to establish a communications session with the device transmitting the information. Unfortunately, for a variety of reasons, including limited communications resources and/or protocol issues, it may be undesirable to transmit advertisements and/or requests in the format in which they are used by higher level modules such as application modules. In addition to possible transmission constraints, the failure of some communications protocols in a standard communications stack to support protocols and/or identifiers in the form in which they are transmitted over an air link, may complicate the ability of a higher level module to initiate transmission of advertisements and/or requests since message information may be lost as a message, advertisement or request is passed from one module to the next in a conventional communications protocol stack.

In view of the above discussion it should be appreciated that there is a need for improved discovery, for example, advertisement and request discovery mechanisms. While not necessary for all embodiments, it is desirable that at least some embodiments address the problem of possible loss of information, e.g., as the result of processing by one or more protocol conversion modules, and provide a way of supplying application, advertisement, request, or other information which may have been omitted from a broadcast during a discovery broadcast time period.

Based on the above discussion, it should be appreciated that there is a need for improved discovery mechanisms suitable for, e.g., wireless communications systems.

SUMMARY

Methods for communicating discovery information, e.g., application identifiers, service identifier, device identifiers, requests and/or other information which maybe used in making a decision on whether or not to establish a communication connection, are described.

In some but not necessarily all embodiments, a module intercepts messages within a device which include a first identifier, e.g., a service, application, device or other identifier which is to be communicated or which is to be monitored for in the case of a device seeking something. A second identifier, e.g., including fewer bits than the first identifier, corresponding to the information to be communicated or item or service being sought is generated. The second identifier is transmitted in the case of an advertisement or monitored for in the case of the device seeking something. Following a second device establishing a communications connection in response to an advertisement, stored information such as all or a portion of the first identifier is transmitted over the established connection. A device seeking an item or service, in response to detecting the second identifier, establishes a connection with the second device. The first identifier may then be communicated over a communications link as part of the established connection. In this manner, communication of the potentially lengthy identifier can avoided until a connection is established based on the second identifier. Thus the discovery information communicated over the airlink can be minimized without losing the ability to communicate the longer identifier for use by an application after establishment of a communications connection.

In accordance with one exemplary aspect, an exemplary communications method comprises receiving a first message in a first format which is in accordance with a first communications protocol, said first message including a first application identifier corresponding to an application; storing at least a portion of said first message; and transmitting a second message in a second format which is in accordance with a second communications protocol, said second message communicating a second application identifier corresponding to said application. In some embodiments the method further includes generating said second message from said first message prior to said step of transmitting.

An exemplary communications device in some embodiments includes at least one processor configured to: receive a first message in a first format which is in accordance with a first communications protocol, said first message including a first application identifier corresponding to an application; store at least a portion of said first message; and transmit a second message in a second format which is in accordance with a second communications protocol, said second message communicating a second application identifier corresponding to said application. The communications device may, and in some embodiments does, include a memory coupled to said at least one processor.

In accordance with one aspect, an exemplary communications method comprises receiving a first message in a first format which is in accordance with a first communications protocol, said first message including a first application identifier corresponding to an application; storing at least a portion of said first message; and monitoring for a second message in a second format which is in accordance with a second communications protocol, said second message communicating a second application identifier corresponding to said application.

An exemplary communications device in accordance with one exemplary embodiment includes at least one processor configured to: receive a first message in a first format which is in accordance with a first communications protocol, said first message including a first application identifier corresponding to an application; store at least a portion of said first message; and monitor for a second message in a second format which is in accordance with a second communications protocol, said second message communicating a second application identifier corresponding to said application. The communications device may, and in some embodiments does, include a memory coupled to said at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

DETAILED DESCRIPTION

Figure 1:
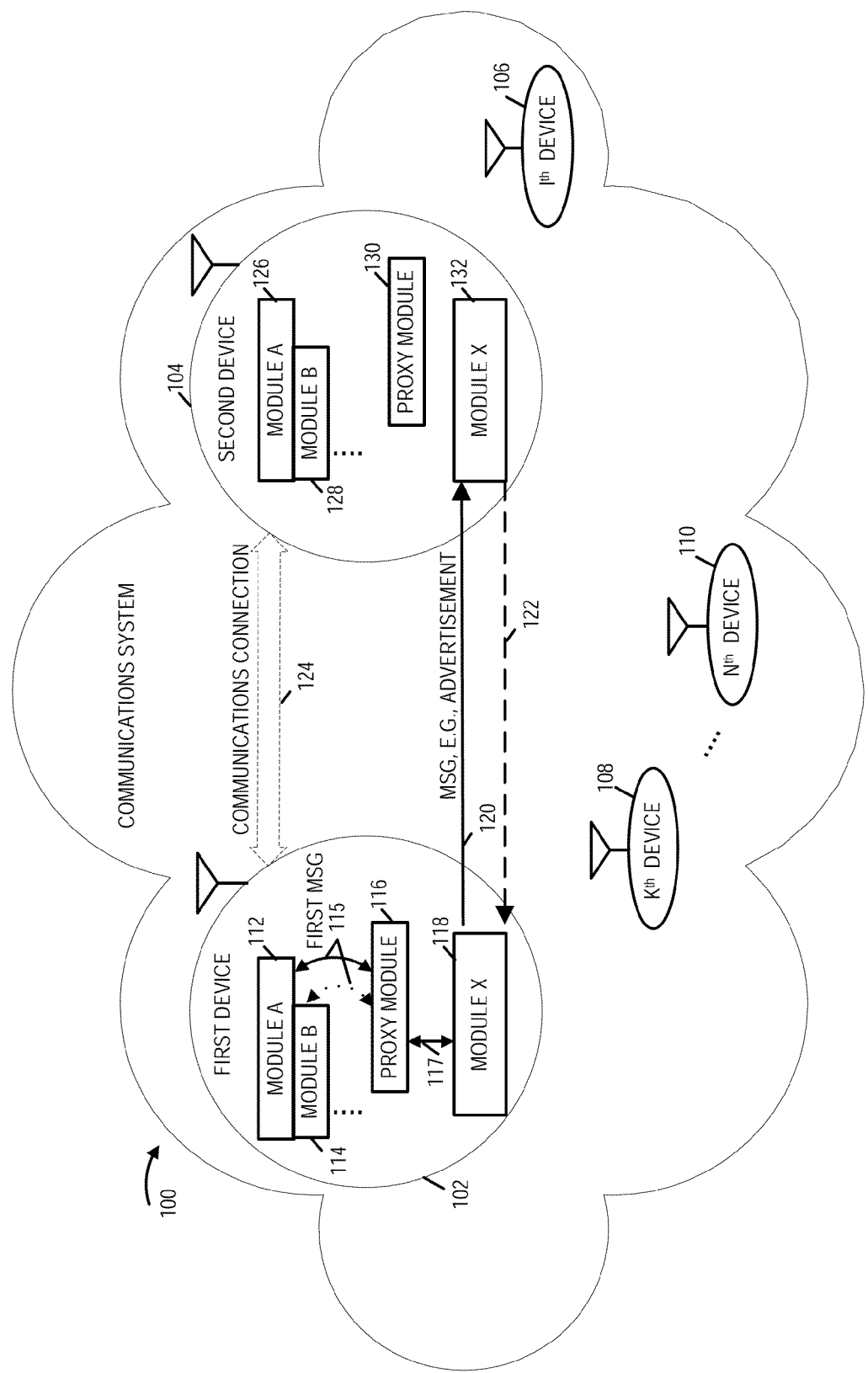
FIG. 1 illustrates an exemplary wireless communications system, in accordance with one exemplary embodiment.

FIG. 1 illustrates an exemplary wireless communications system, e.g., network 100, e.g., an ad hoc peer to peer wireless communications network, in accordance with one exemplary embodiment. Exemplary communications system 100 includes a plurality of communications devices, e.g., peer to peer communications devices. In some embodiments, the exemplary communications system 100 may also include other communications devices, for example such as one or more access router(s). The plurality of peer to peer communications devices includes first, second, $I^{th}$, $K^{th}$ and $N^{th}$ peer to peer communications devices 102, 104, 106, 108 and 110, respectively. In some embodiments the $I^{th}$ communications device 106 is, e.g., an access router. The access router 106 may, and in some embodiments does, communicate with the peer to peer devices using peer to peer signaling and may provide access to the internet or another network via a wired or fiber network connection. As will be discussed below, the first and second peer to peer communications devices 102, 104 may broadcast and receive peer discovery messages and/or other information in addition to various connection establishment signals as part of a process of establishing a connection between two or more of the devices 102, 106, 106, 108, 110.

In the FIG. 1 example, the first communications device 102 includes a plurality of modules, e.g., application and/or protocol modules. The modules include module A 112, module B 114, a proxy module 116, . . . , module X 118. The proxy module 116 in some embodiments is, e.g., a service discovery proxy. In some embodiments, the modules correspond to different communications protocols thereby allowing the first device 102 to use a variety of protocols and to pass information from one communications layer to another communications layer which uses a different communications protocol. As shown in FIG. 1, the second communications device 104 also includes a plurality of modules which may be the same or similar to the modules included in the first communications device 102. The plurality of modules in the second communications device 104 includes module A 126, module B 128, a proxy module 130, . . . , module X 132. Module A 126 may be an application module while module B 128 may be a protocol module. Although the protocol modules have been shown to be included in the first and second communications devices 102, 104, it should be appreciated that other communications devices in communications network 100 may also include protocol modules with similar functionality. In some embodiments, protocol module X 116 in the first device 102 and protocol module X 132 in the second device 104, is an airlink module which is capable of generating airlink signals, sending and/or exchanging signals with other communications devices in the communications network 100. The proxy modules 116, 130 in the first and second devices 102, 104 are capable of interacting, communicating and/or exchanging signals with other protocol modules of the respective devices with which the proxy modules 116, 130 are associated. In some embodiments, proxy modules 116, 132 may reside in one of the protocol modules and yet may exist as a separate module in other embodiments.

Module A 112 may correspond to, e.g., a printer application, which is available for use by other communications devices in the network 100, and the availability could be announced/advertised by the first device 102. Module A 112 may send a first message 115, in accordance with a first communications protocol, e.g., an application layer protocol or other protocol, including a first application identifier corresponding to the application to which Module A corresponds with the intent of a lower layer protocol module processing the message and, after processing by one or more lower layer protocol modules, ultimately causing the module corresponding to the air interface, e.g., Module X 118 to transmit an advertisement advertising the application to which Module A corresponds and/or identifying the first device. In some embodiments, the first format is one of an mDNS (multicast Domain Name System) format, a DNS-SD (DNS-service discovery) format, a UDP (User datagram protocol) format, an IP (Internet protocol) format, a UPnP format (Universal plug and play), and a SSDP (Simple service discovery protocol) format. In some embodiments, the first message 115 may be received, e.g., intercepted, by the proxy module 116 which then interacts with the air interface Module X 118, via signal 117, effectively bypassing one or more lower layer protocol modules that may be used to convert between the protocol used by application Module A 112 and the air interface (airlink) Module X 118. The proxy module 116, in some embodiments, stores at least a portion of the first message for use in subsequent processing related to responses to the first message. Some of the stored information, e.g., a first application identifier or device identifier used by Module A 112, may not be passed to the airlink module 118. The proxy module 116 may communicate a second identifier which is used for advertisements over the airlink corresponding to the application identified by the application identifier communicated by Module A 112. The airlink module 118 may transmit a second message 120 in accordance with a second communications protocol which is different from the communications protocol used for the first message 115. The second message 120 may communicate the second application identifier corresponding to the application which Module A 112 is seeking to advertise and/or identify the first device 102.

The second device 104 may receive the second message 120 and respond back to the first communications device 102, e.g., if the first device 102 is of interest to the second device 104, or for example if the second device 104 is interested in the application that has been announced/advertised in the second message 120. In some embodiments, the second device 104 responds back by communicating a signal 122, e.g., a connection initiation signal, to the first device 102. In some such embodiments, in response to receiving the signal 122, the first device 102 participates in the connection establishment process. Thus in one embodiment, a communications connection 124, e.g., an IP based connection/network layer connection, is established between the first device 102 and the second device 104. In some embodiments the communications connection 124 is, e.g., at the medium access control (MAC) layer optionally with reserved communications resources.

In at least some embodiments, following the establishment of a communications connection 124 with another device of interest, which in this example is the second communications device 104, the first communications device 102 transmits at least a portion of the stored portion of the first message to the second device 104 over the communications connection 124. Thus, it should be appreciated that signaling exchange between the first and second devices 102, 104 over, e.g., an IP based communication connection, occurs if a device discovers that other party, e.g., device, service and/or application, is of interest. By delaying the use of identifiers and/or other information corresponding to higher level protocols until after discovery and a decision to establish a connection based on the lower layer airlink signals, e.g., the message advertisement, overall efficiency in using airlink resources is achieved. This is because initial decisions to establish a connection are based on messages, e.g., advertisements, which can be transmitted using relatively few bits. While the decision to establish a connection with the overhead associated therewith can be made in a reasonably reliable way avoiding many otherwise unnecessary connections and/or the need to transmit detailed and lengthy advertisements, the method allows for confirmation that a device or application is truly of interest by exchanging, via communications connection 124, some of the information stored by proxy module 116, e.g., a higher level application or device identifier, after a connection is established.

Figure 2:
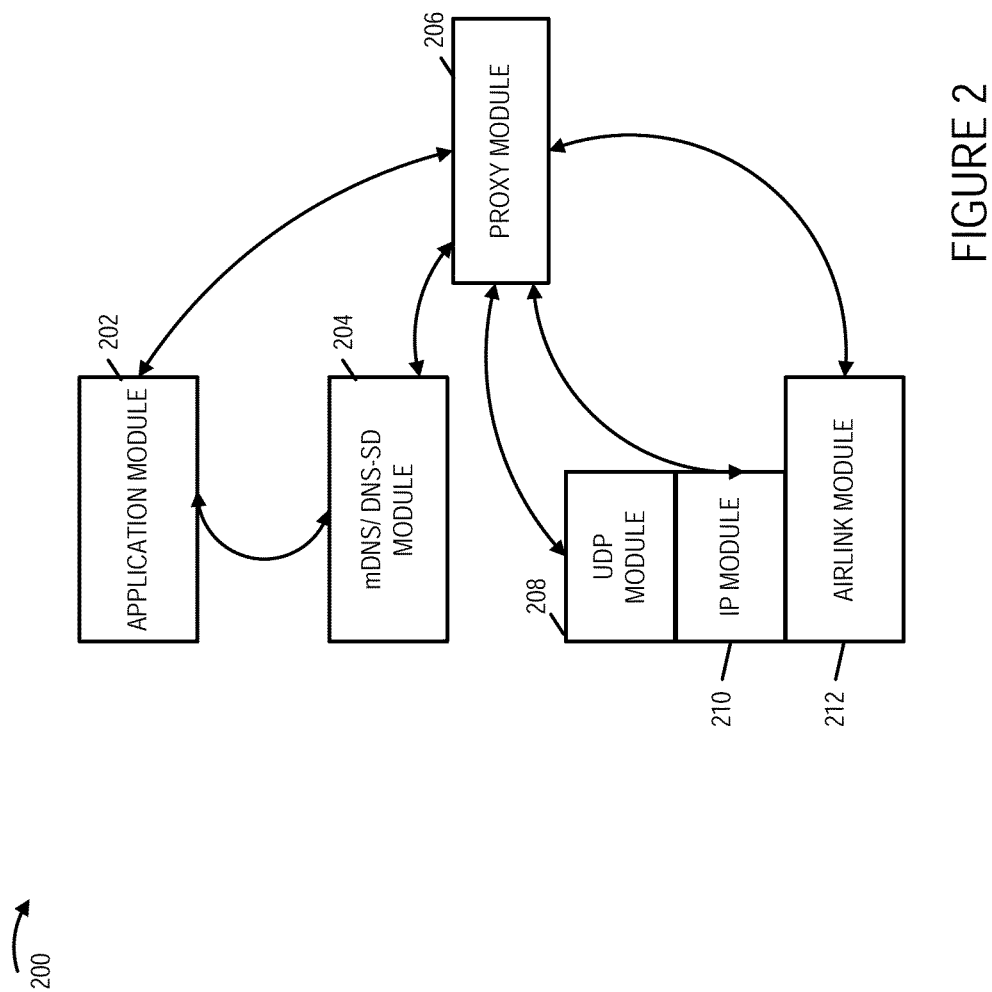
FIG. 2 is a drawing illustrating a plurality of exemplary modules, which may be used in the exemplary system of FIG. 1.

FIG. 2 is a drawing 200 illustrating a plurality of exemplary modules 202, 204, 204, 208, 210, 212, e.g., which use protocols and/or signaling corresponding to different communications layers. While signals and/or messages are normally passed between the lower physical layer module, e.g., airlink module 212, through various intermediary modules 210, 208, 204 corresponding to different communications layers and/or protocols to communicate with application module 202, in accordance with various embodiments, the proxy module 206 may intercept the communications and bypass one or more of the intermediate module 204, 208, 210 to facilitate communication between the lower layer module 212 and application module 202, as represented by the bi-directional arrows shown in FIG. 2. Thus, in some embodiments, the proxy module 206 may intercept an advertisement message directly from the application module 202 and/or from any other protocol module, e.g., UDP module 208, and provide relevant signals and/or message after a suitable format conversion, to airlink module 212.

In some embodiments the modules may be associated with, e.g., a communications device and/or a network. The plurality of modules shown in FIG. 2 includes the application module 202, an mDNS/DNS-SD module 204, the proxy module 206, the UDP module 208, the IP module 210 and the airlink module 212. In some embodiments the application module 202 corresponds to one or more applications and/or services associated with, e.g., a device and/or a network such as network 100. The application and/or service may include, for example, printer service, a facsimile service etc., which is available to, e.g., members or users of a network such as network 100. In some embodiments the protocol modules such as mDNS/DNS-SD module 204, UDP module 208, IP module 210 and the airlink module 212 correspond to different communications protocols. In one embodiment, the proxy module 206 is, e.g., a proxying agent, capable of intercepting communications, e.g., messages, between various other protocol modules. In addition, the proxy module 206 in some embodiments, is also capable of translating messages, e.g., a service discovery message, from a first format to an alternative and, in various embodiments, more compact second format. The first format may be in accordance with a first communications protocol, e.g., mDNS and the second format may be in accordance with a second communications protocol, e.g., an airlink protocol.

In accordance with one exemplary embodiment, which will be discussed further below with reference to FIG. 3, an application and/or service to which the application module 202 corresponds, attempts to initiate a service discovery process, e.g., by service advertisement, through the mDNS/DNS-SD module 204. The mDNS/DNS-SD module 204 may then generate a message, e.g., a first service advertisement message. Such a service advertisement message may normally be processed by different protocol modules 208, 210 prior to being transmitted over the air. However in accordance with one exemplary embodiment, the proxy module 206 intercepts the first service advertisement message from the mDNS/DNS-SD module 204, stores at least a portion of the message and generates a second advertisement message in an alternative and concise form. Thus, in the case of such an example, processing by UDP module 208 and IP module 210 is avoided. In some embodiments the second advertisement message includes fewer bits than the first service advertisement message. For example, the second advertisement message may have lower payload. In one exemplary embodiment, the proxy module 206 then communicates the second advertisement message to the airlink module 212 which transmits the second advertisement message over the air to one or more communications devices.

Figure 3:
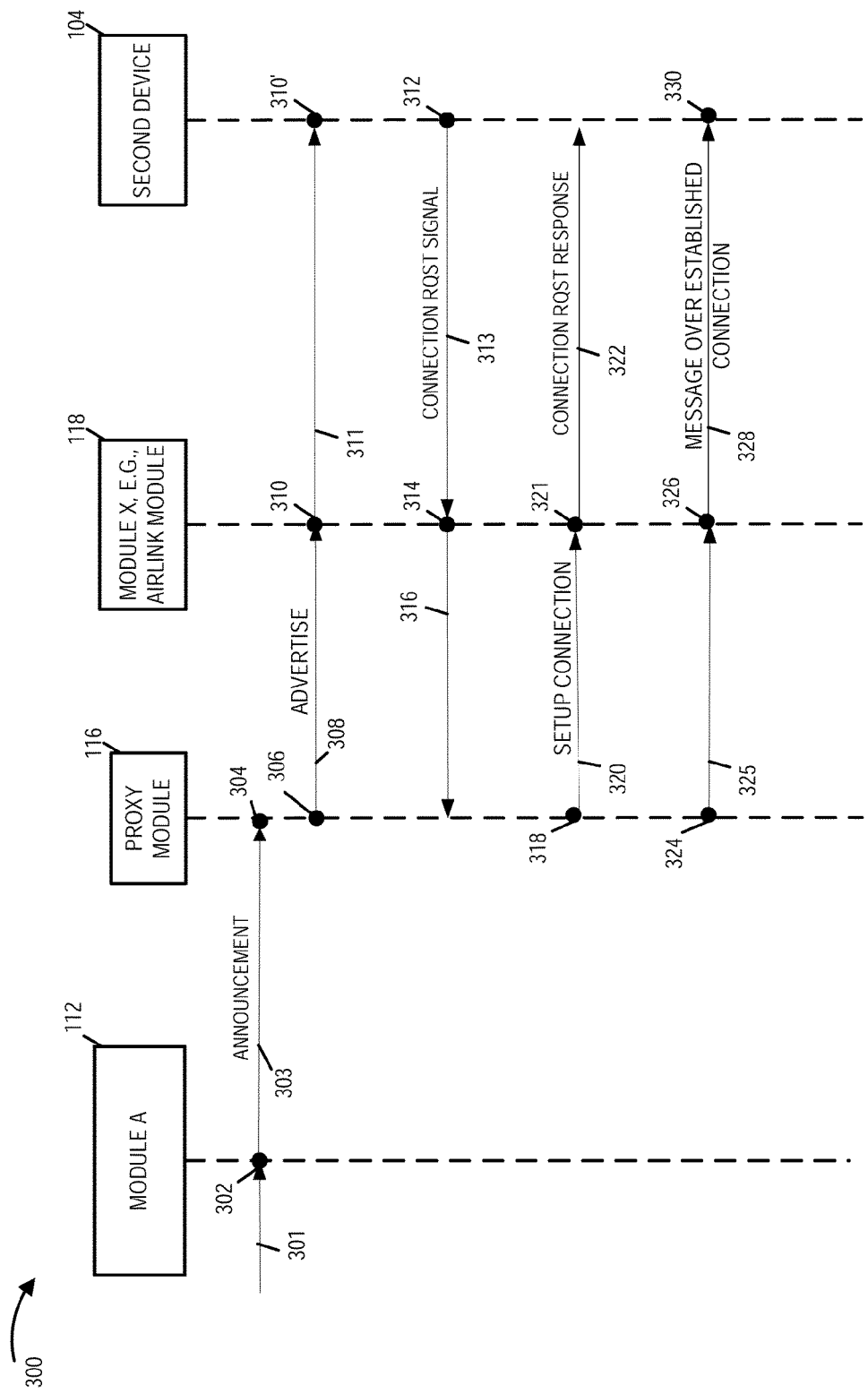
FIG. 3 illustrates signaling and exemplary steps which may be used in advertising and detecting information in the system of FIG. 1, in accordance with an exemplary embodiment.

FIG. 3 illustrates the signaling and steps associated with an exemplary method of using a proxy, e.g., a service discovery proxy, to support service announcements, in accordance with an exemplary embodiment. FIG. 3 shows a signaling exchange between different modules 112, 116, and 118 associated with a communication device, e.g., the first device 102 of FIG. 1. In accordance with an exemplary embodiment, an input signal 301, e.g., from the user of the first device 102, triggers the generation of a first message 303 which may be an announcement message, e.g., a device and/or service and/or application advertisement from the module A 112. In some embodiments, the input 301 may be from an application and/or service that wishes to announce its availability to other devices in the network 100. As shown in step 304 the proxy module 116 receives, and in some embodiments intercepts, announcement message 303. The first message 303 may be, and in many cases is, in a first format. As part of the processing performed in step 304 the proxy module 116 stores at least a portion of the first message 303, e.g., for possible later communication to the second device. Although, the announcement message 303 is shown to be originating from protocol module A 112, it should be appreciated that the announcement message 303 may be from other protocol modules included in the first device 102, e.g., one of the lower layer modules which is above the physical airlink layer module 118. In some embodiments, the proxy module 116 translates the announcement message 303 to a second format, e.g., a more compact format which can and is transmitted from airlink module X 118. In some embodiments, the second format is a link layer format. In step 306, the proxy module 116 sends a request message 308 to the module X 118 to advertise the announcement, the request message being in a second format. In step 310, the protocol module X 118 receives the request message 308 and transmits the announcement message as a second message 311. In step 310', another communication device, e.g., second device 104, receives the second message 311.

In step 312 the second device 104 that receives the second message 311 sends a connection request signal 313, e.g., a signal to initiate a communications connection. In step 314, the module X 118 receives the connection request signal 313 from the second device 104, and a request message 316 is sent from the module X 118 to the proxy module 116, indicating that the second device wants to initiate a connection establishment. In step 318 following the receipt of request message 316, the proxy module sends a signal 320 to the airlink module X 116 to proceed with establishing a communications connection, e.g., an IP based connection, with the second device from which the connection request signal 313 was received. In step 321 the airlink module X 116 sends a connection request response signal 322 to the second device 104, and a communications connection is established. In step 324, following establishment of the connection with the second device 104, the proxy 116 sends at least a portion of the stored portion of the first message 303 as message 325, to the airlink module 118. This provides the second device, e.g., with a longer identifier that was stored by the proxy module 116 but not sent as part of the original over the air advertisement signal 311. In step 326 the airlink module 116 receives the message 325 and transmits it as a message 328 over the established connection. The second device 104 receives the message 328 in step 330 and then can use the longer identifier to confirm its interest in, and understanding of, what was being advertised or announced.

Figure 4:
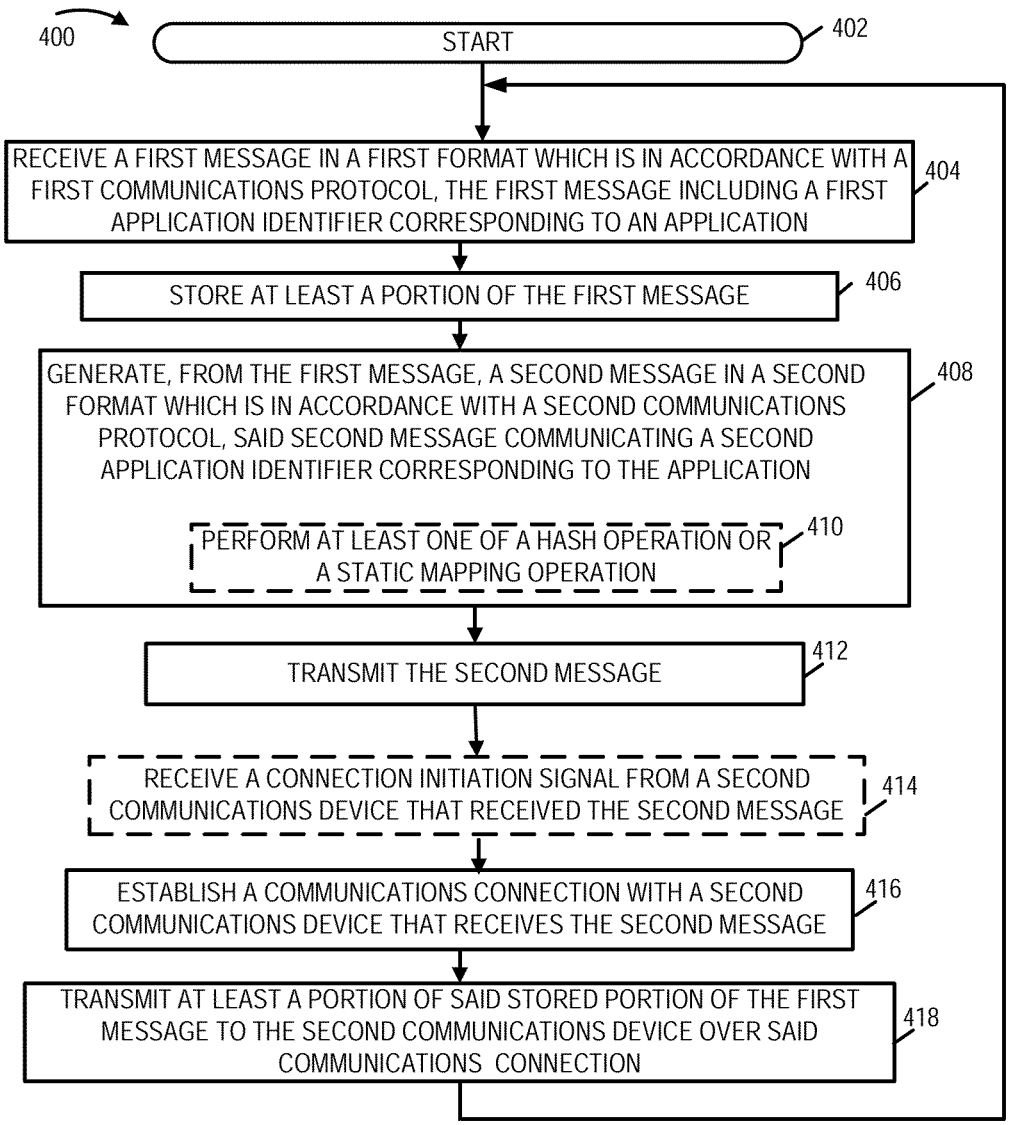
FIG. 4 is a flowchart of an exemplary communications method in accordance with one exemplary embodiment.

While an exemplary embodiment has been used to describe various features, the method used in some embodiments will become even clearer when considered in view of the flow chart shown in FIG. 4.

FIG. 4 is a flowchart 400 illustrating the steps of an exemplary communications method, in accordance with one exemplary embodiment. In some embodiments the exemplary communications method is implemented by a communications device of network 100. The communications device may be, e.g., a first peer to peer communications device 102 shown in FIG. 1.

Operation starts in step 402 where the first device is powered on and initialized. Then in step 404 a first message is received in a first format which is in accordance with a first communications protocol, said first message including a first application identifier corresponding to an application. In some embodiments receiving the first message includes intercepting a communication between different protocol modules. For example, the first message may be an internal message from a protocol module, e.g., module A 112 to another protocol module e.g., module B 114 of FIG. 1. The different protocol modules may support different communications protocols. In some embodiments, the first format is one of an mDNS format, a DNS-SD format, a UDP format, an IP format, a UPnP format, and a SSDP format. As discussed earlier in the example of FIG. 1, the first message may be, e.g., a service announcement, peer device advertisement and/or announcement related to an application.

Operation proceeds from step 404 to step 406 wherein the first device 102 stores at least a portion of the first message, e.g., in a memory. Operation proceeds from step 406 to step 408. In step 408 the first device 102 generates from a portion of the first message, a second message in a second format which is in accordance with a second communications protocol, said second message communicating a second application identifier corresponding to said application. The second application identifier may, and in some embodiments does, include fewer bits than the first application identifier. In accordance with one aspect, the proxy module 116 associated with the first device 102 is capable of mapping portions of the first message, e.g., service and/or application name, type, etc., to an alternative concise form in the second message. This mapping may be performed by using some functions or algorithms, e.g., a compression or hashing function and/or some other transformation function. In some embodiments, the step of generating a second message includes performing sub-step 410. In sub-step 410 the first device 102 performs at least one of a hash operation and a static mapping operation, to generate a portion of the second message. For example, the first device may perform a hash operation on portion of the first message to generate portion of the second message, e.g., a 3 bit code. Thus in some embodiments, the second message includes fewer bits than the first message. Although the second message is in a different format than the first message, it should however be appreciated that the second message communicates a second application identifier which corresponds to the same application to which the first application identifier corresponds. As noted above, in some embodiments the second application identifier includes fewer bits than the first application identifier making it less costly, in terms of airlink resources, to transmit over the airlink than the first identifier. Fewer bits in the second application identifier may be the result of performing one of a hash operation or static mapping operation. It should be appreciated that the first and second application identifiers although different in format and other aspects, still correspond to the same application. Operation proceeds from step 408 to step 412.

In step 412 the first device 102 transmits the second message, e.g., to one or more communications devices in the network 100. The transmission of the second message may, and sometimes is, over an airlink. In some embodiments the first message includes a broadcast or multicast indicator. The broadcast or multicast indicator may indicate, for example, whether the intercepted first message was intended to be broadcast or multicast, e.g., to a communications device and/or to a group or plurality of communications devices. In some embodiments the second message is transmitted during a discovery time interval. In some embodiments the second message is transmitted during a predetermined time interval. Operation proceeds from step 412 to optional step 414 wherein a signal, e.g., a connection initiation signal 122, is received from a device that received the second message. In one embodiment, the first device 102 receives the connection initiation signal 122 from the second device 104. In some embodiments, the signal 122 may be received by one of the protocol modules associated with the device implementing the method of flowchart 400. The connection initiation signal 122 may be, e.g., a paging signal. In some embodiments the first device 102 may initiate connection establishment and no connection initiation signal may be received from the other device and thus step 414 is skipped. In such embodiments the operation proceeds directly from step 412 to 416.

In step 416 a communications connection, e.g., communications connection 124, is established with a device, e.g., second communications 104, that receives the second message. In some embodiments the second device may initiate the establishment of the communications connection. In some embodiments, for example where the connection initiation signal 122 is received from the second device 104 that received the second message, the first device 102 establishes the communications connection with the second device 104. In some embodiments the connection establishment may be performed by one of the protocol modules associated with the device implementing this method. Operation proceeds from step 416 to step 418 wherein the first device 102 transmits at least a portion of the stored portion of the first message that was intercepted and stored, to the second device 104 over the established communications connection. Thus, it should be appreciated that establishment of a communications connection, e.g., a network layer connection, as well as transmission of signals and/or messages with higher payload from the first device 102 to the second device is deferred and occurs if the devices discover that other party, e.g., a device, service and/or application, is of interest. Operation proceeds from step 418 back to step 404. By transmitting at least a portion of the first message after connection establishment, the second device is provided with additional information and/or a longer identifier that can be used by the second device to confirm its interest in the application, service or first device from which the first message originated. Thus, information that may have been lost as a result of generating a message in the second format is supplied by the proxy module to the second device after a communications connection is established with the second device.

Figure 5:
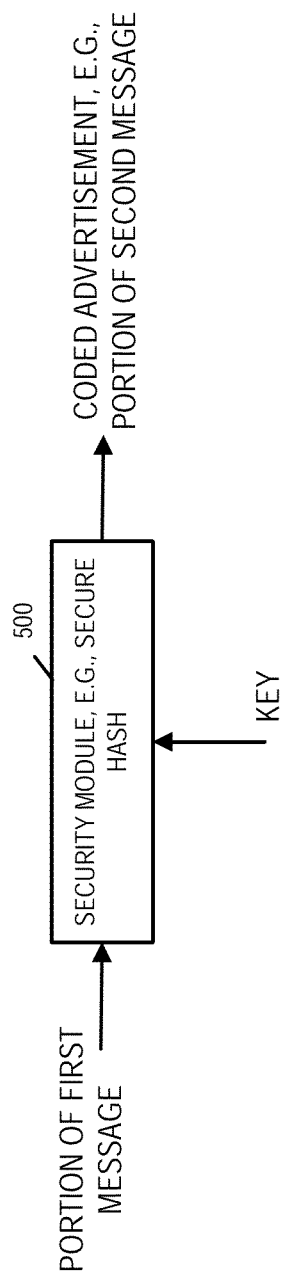
FIG. 5 is an exemplary secure hashing module which may be used in a communications device to perform hashing operation which may be performed as part of the method of FIG. 4.

FIG. 5 is an exemplary secure hashing module 500 which may be used in one or more of the communications devices shown in communications network 100. In some embodiments the secure hashing module 500 may be used by the first device 102, to perform hashing operation on portion of an exemplary first message. In accordance with an exemplary embodiment, a device and/or service and/or application associated with a network, e.g., a printer, may register its presence in, e.g., a DNS database. When it is desired that a service and/or device and/or application announcement be made, e.g., as a first message 115, the proxy module 116 intercepts the first message 115 and a portion of the first message 115 is hashed, e.g., by a shared key, to generate an alternative concise form message which in one example is the second message. The second message may, and in some embodiments is, then advertised, e.g., transmitted over the air, to one or more communications devices by the airlink module 118. In some embodiments, the hashing module 500 is responsible for performing the hashing operation, wherein a portion of the first message 115 is the input to the hashing module 500 and a portion of the second message is the output.

Figure 6:
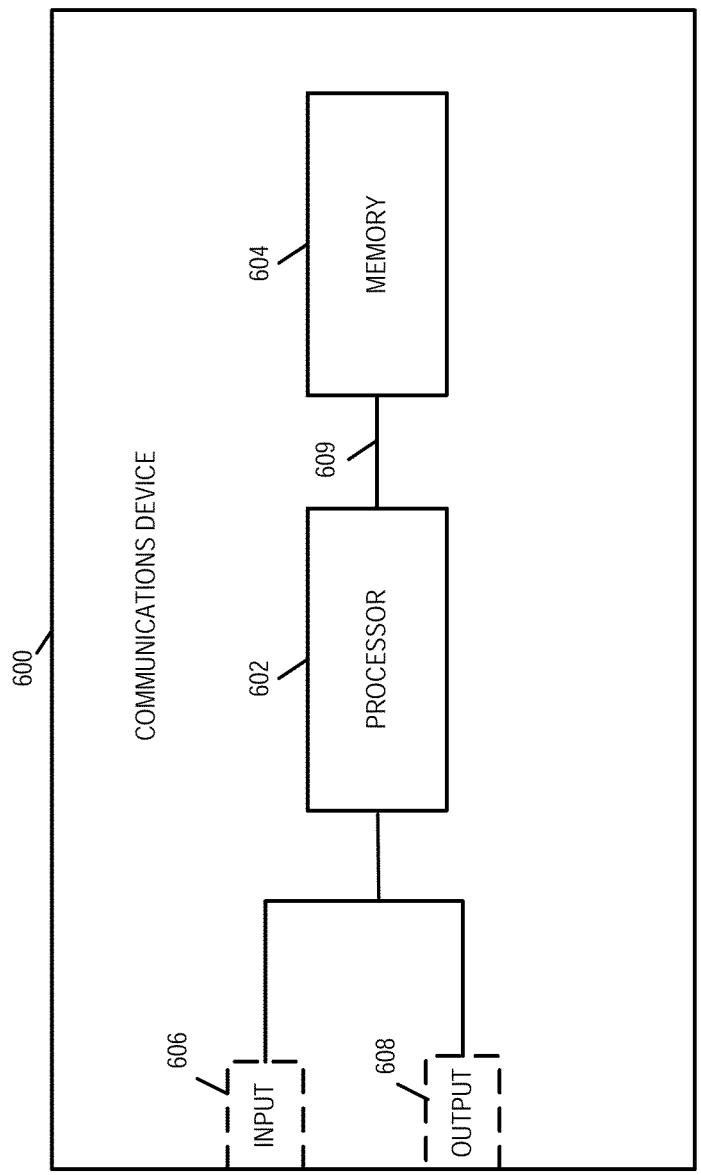
FIG. 6 illustrates an exemplary communications device which can be used in the system of FIG. 1.

FIG. 6 is a drawing of an exemplary communications device 600 in accordance with one exemplary embodiment. Communications device 600 maybe, and in at least one embodiment is, a mobile wireless terminal supporting peer to peer communications and implementing a method in accordance with flowchart 400 of FIG. 4. The communications device 600 may be used as the first communication device 102 of FIG. 1. Communications device 600 includes a processor 602 and memory 604 coupled together via a bus 609 over which the various elements (602, 604) may exchange data and information. Communications device 600 further includes an input module 606 and an output module 608 which may be coupled to the processor 602 as shown. However, in some embodiments the input module and output module 606, 608 are located internal to the processor 602. Input module 606 can receive input signals. Input module 606 can, and in some embodiments does, include a wireless receiver and/or a wired or optical input interface for receiving input. Output module 608 may include, and in some embodiments does include, a wireless transmitter and/or a wired or optical output interface for transmitting output.

Processor 602, in some embodiments, is configured to: receive a first message in a first format which is in accordance with a first communications protocol, said first message including a first application identifier corresponding to an application; store at least a portion of said first message; and transmit a second message in a second format which is in accordance with a second communications protocol, said second message communicating a second application identifier corresponding to said application. In some embodiments the processor 602 is configured to generate the second message from the first message prior to transmitting the second message. In some embodiments the processor 602 is further configured to perform at least one of a hash operation or a static mapping operation in order to generate portion of the second message from portion of the first message. In at least one embodiment the processor is further configured to intercept a communications between different protocol modules. In some embodiments, the processor 602 is further configured to transmit the second message during a discovery time interval.

In some embodiments, the second message includes fewer bits than the first message. The processor 602 may and in some embodiments is, further configured to establish a communications connection with a second communications device, e.g., second device 104, that receives said second message. In at least some embodiments, the processor 602 is configured to establish the communications connection in response to receiving a connection initiation signal, e.g., a paging signal, from the second communications device. In some embodiments the processor 602 is further configured to transmit at least a portion of said stored portion of the first message to said second communications device over said communications connection.

Figure 7:
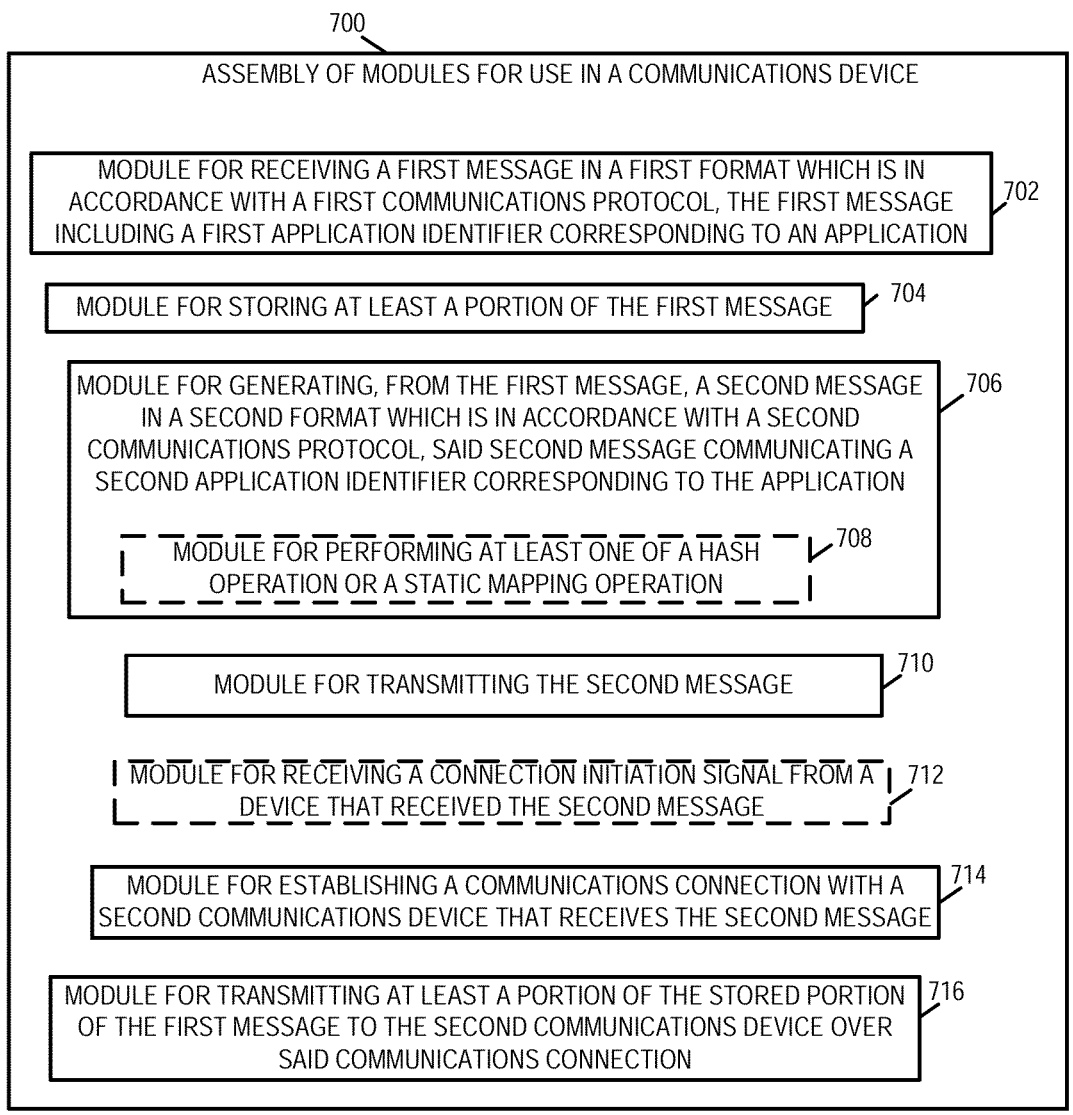
FIG. 7 illustrates an assembly of modules which can be used in the exemplary communications device of FIG. 6.

FIG. 7 is an assembly of modules 700 which can, and in some embodiments are, used in the communications device 600 illustrated in FIG. 6. The modules in the assembly 600 can, and in some embodiments are, implemented in hardware within the processor 602 of FIG. 6, e.g., as circuits. Alternatively, the modules can, and in some embodiments are, implemented in software, e.g., as sets of instructions, and stored in the memory 604 of the communications device 600 shown in FIG. 6. In other embodiments, combinations of software and hardware modules are used. While shown in the FIG. 6 embodiment as a single processor, e.g., computer, it should be appreciated that the processor 602 may be implemented as one or more processors, e.g., computers.

When implemented in software the modules include code, which when executed by the processor 602, configure the processor to implement the function corresponding to the module. In embodiments where the assembly of modules 700 is stored in the memory 604, the memory 604 is a computer program product comprising a computer readable medium comprising code, e.g., individual code for each module, for causing at least one computer, e.g., processor 602, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 7 control and/or configure the communications device 600 or elements therein such as the processor 602, to perform the functions of the corresponding steps illustrated in the method flow chart of FIG. 4.

As illustrated in FIG. 7, the assembly of modules 700 includes a module 702 for receiving a first message in a first format which is in accordance with a first communications protocol, said first message including a first application identifier corresponding to an application, a module 704 for storing at least a portion of said first message, a module 706 for generating, from the first message, a second message in a second format which is in accordance with a second communications protocol, said second message communicating a second application identifier corresponding to said application. In some embodiments the module 706 for generating the second message also includes a module 708 for performing at least one of a hash operation or static mapping operation. The hashing operation and/or static mapping operation may be used for generating the second message or portion of the second message.

The assembly of modules 700 further includes a module 710 for transmitting the second message, an optional module 712 for receiving a connection initiation signal from a device, e.g., second device 104, that received the second message, a module 714 for establishing a communications connection with a second communications device that receives the second message, and a module 716 for transmitting at least a portion of the stored portion of the first message to the second communications device over the communications connection.

Figure 8:
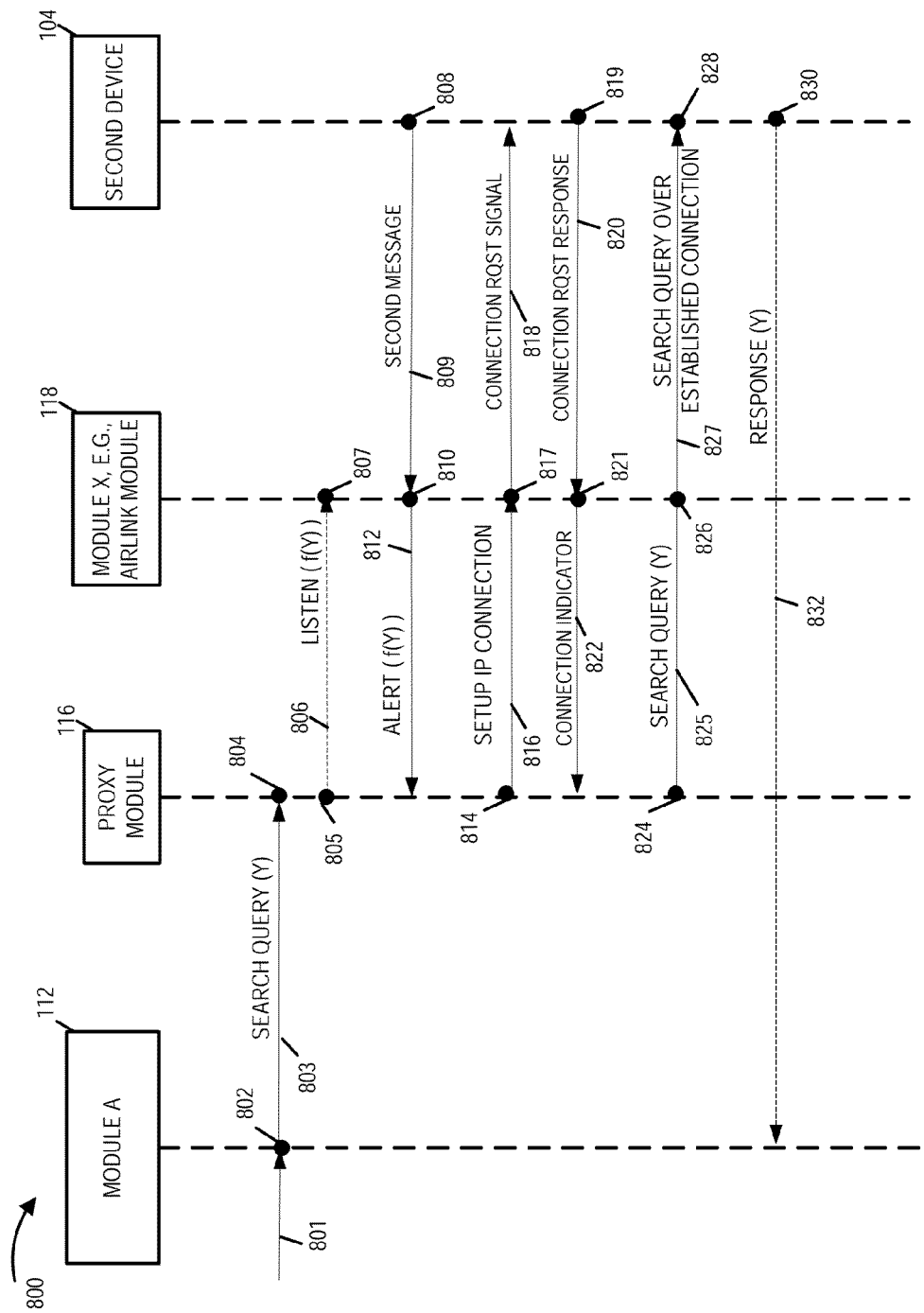
FIG. 8 illustrates the signaling and steps associated with an exemplary method of supporting a search query announcement, in accordance with an exemplary embodiment.

FIG. 8 illustrates the signaling and steps associated with an exemplary method of using a proxy, e.g., a service discovery proxy, to support search query announcements, in accordance with another exemplary embodiment. FIG. 8 shows signaling exchange between different modules 112, 116, 118 associated with a communication device, e.g., the first device 102 of FIG. 1. In accordance with an exemplary embodiment, an input signal 801 triggers generation of a search query message 803, e.g., a search for a device, service and/or application Y that the first device 102 seeks, in step 802. The input signal 801 that triggers the search query may be, e.g., from the user of the first device 102. For example, the user of the first device 102 may wish to print a document and wishes to locate where in the network printing service is available. In such a scenario, the user may invoke some functions in the first device 102 which initiates a search query for the printer service.

In step 804, the proxy module 116 receives, and in some embodiments intercepts, the search query message 803. The received message 803 may, and in some embodiments is, stored by the proxy module 116. In the case of interception of the message 803, the received message 803 is not communicated to the module to which it was originally directed. In some embodiments, the received search query message 803 is in a first format which is in accordance with a first communications protocol, said search query message including a first application identifier corresponding to an application Y. For example, the application may correspond to the printer service. In step 805, following the receipt of the search query message 803, the proxy module 116 sends a request message 806, to the airlink module X 118 to cause the module X 118 to listen, e.g., monitor for, a second message in a second format, said second message communicating a second application identifier corresponding to said application Y. In some but not all embodiments the request message 806 communicates a message in the form of Listen (f(Y)) which is a request that the airlink module listen on the airlink for a particular signal, e.g., a signal including a set of bits which is a function f, of the application identifier Y. Thus, the signal to be listened for can be expressed as f(Y) where f is a specified or known function used to process all or a portion (e.g., the application identifier Y) of the received message 803 to generate at least a portion of the request message 806. Thus, the request message 806 normally includes a second, e.g., shorter identifier corresponding to application Y generated by applying the function f to the identifier Y obtained from the received message 803. An exemplary module for producing the identifier f(Y) by applying a function f to an input Y is shown in FIG. 5.

In step 807 the airlink module X 118 receives the request message 806 and starts monitoring for the second message.

In step 808 a communications device, e.g., second device 104, transmits, e.g., broadcasts, second message 809. In step 810, module X 118 detects the second message 809 broadcast by the second device 104 and generates an alert 812 and notifies the proxy module 116. Following the receipt of notification/alert 812 from the module X 118, the proxy agent, i.e., the proxy module 116 in step 814 sends a request 816 to the airlink module X 118 to establish a communications connection, e.g., an IP based/network layer connection, with the second device 104 from which the second message 809 has been detected. In step 817 the airlink module 118 sends a communication establishment request signal 818 to the second device 104. In step 819 the second device responds by sending a connection request response signal 820 and a communications connection is thus established. In step 821 the airlink module 118 sends a connection establishment indicator signal 822 to the proxy module 116 indicating the establishment of the communications connection with the second device 104. In step 824 the proxy module 116 sends at least a portion of the stored portion of the search query message 803 as message 825, to the airlink module 118 for transmission to the second device 104. In step 826 the airlink module 118 transmits the received message 825, as message 827 which may be in a format suitable for transmission over the established connection, to the second device 104. In step 828 the second device 104 receives the message 827 over the established connection. In step 830 the second device 104 may optionally respond to the search query message with more information of the queried service and/or application by optionally sending response message 832.

Figure 9:
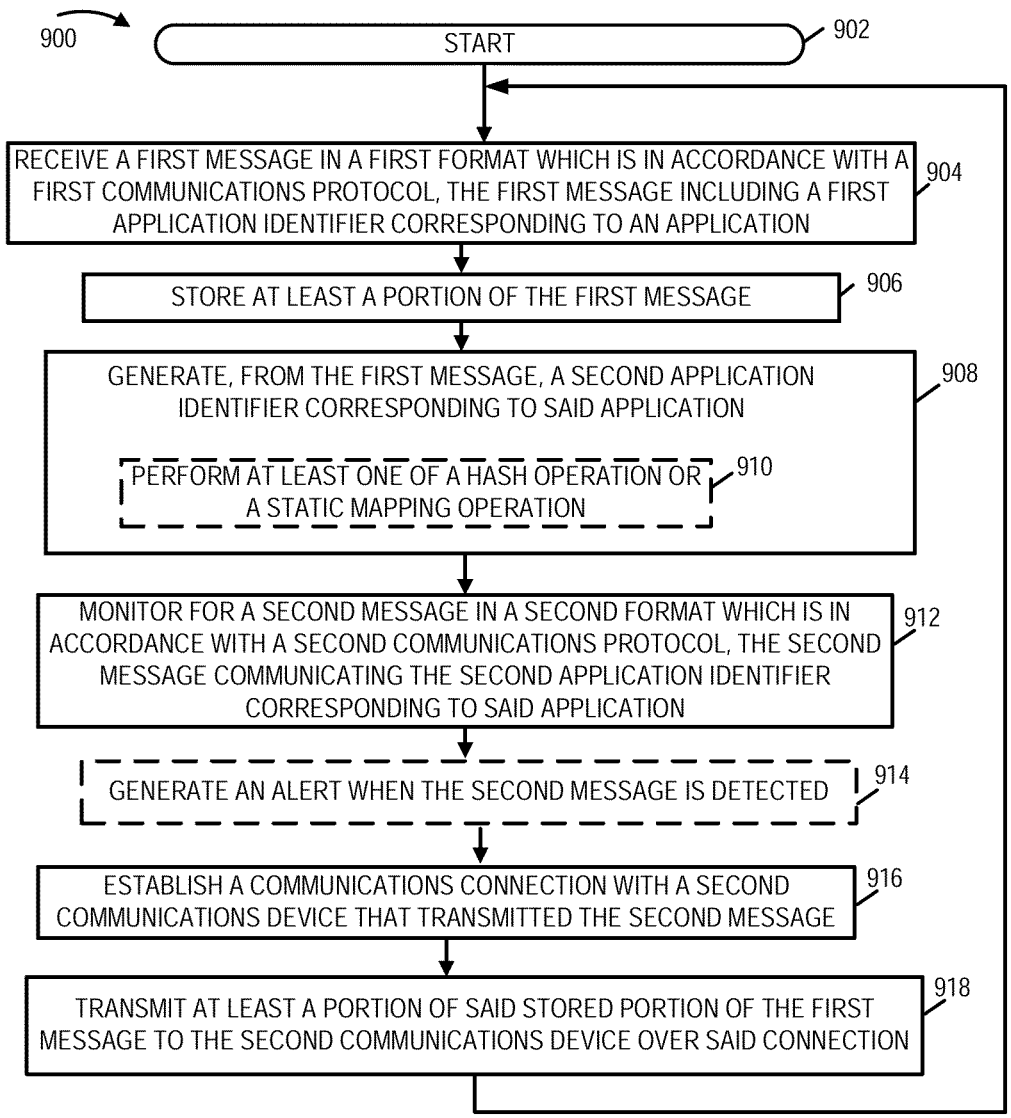
FIG. 9 is a flowchart of an exemplary communications method in accordance with one exemplary embodiment.

FIG. 9 is a flowchart 900 illustrating the steps of an exemplary communications method, in accordance with one exemplary embodiment. In some embodiments the exemplary communications method is implemented by a communications device, of network 100. The communications device may be, e.g., first peer to peer communications device 102 shown in FIG. 1.

Operation starts in step 902 where the first device 102 is powered on and initialized. Then in step 904 a first message is received in a first format which is in accordance with a first communications protocol, said first message including a first application identifier corresponding to an application. In some embodiments receiving the first message includes intercepting a communication between different protocol modules. For example, the first message may be an internal message from a protocol module, e.g., module A 112 to another protocol module e.g., module B 114 of FIG. 1. The different protocol modules may support different communications protocols. In at least one embodiment the first message is a search query message from, e.g., an application module and/or one of the protocol modules associated with the communications device implementing the method of flowchart 900. In some embodiments, the first format is one of an mDNS format, a DNS-SD format, a UDP format, an IP format, a UPnP format, and a SSDP format.

Operation proceeds from step 904 to step 906 wherein the first device 102 stores at least a portion of the first message, e.g., in a memory. Operation proceeds from step 906 to step 908. In step 908 the first device 102 or one of the protocol modules associated with the device implementing the method 900, generates from a portion of the first message, a second application identifier corresponding to said application. In accordance with one aspect, the proxy module 116 associated with the first device 102 is capable of generating the second application identifier corresponding to the application to which the first application identifier corresponds, from the portion of the first message. The second application identifier may, and sometimes is, in an alternative concise form, i.e., including less bits than the first application identifier. This second application identifier may be generated by performing, e.g., compressing or hashing operation, on portion of the first message. In some embodiments, the step 908 of generating a second application identifier includes performing sub-step 910 wherein, at least one of a hash operation and a static mapping operation is performed, to generate the second application identifier. For example, the first device 102 may perform a hash operation on portion of the first message, to generate the second application identifier, e.g., a code. In some embodiments, the second application identifier includes fewer bits than the first application identifier. It should be appreciated that the first and second application identifiers although different in format and other aspects, still correspond to the same application. Operation proceeds from step 908 to step 912.

In step 912 the first device 102 or one of the protocol modules associated with the device implementing this method, monitors for a second message in a second format, which is in accordance with a second communications protocol, said second message communicating the second application identifier corresponding to said application. In some embodiments the step of monitoring for the second message is performed during a predetermined interval. Since the second message communicates the second application identifier, which is known to the first device 102 monitoring for the second message, the first device 102 is able to identify when a match is found to the device, application and/or service being searched in the search query message. Operation proceeds from step 912 to optional step 914 wherein the first device 102, e.g., a module in the first device monitoring for the second message, generates an alert when the second message is detected. The second message may be transmitted by, e.g., second device 104. The second message may be, for example, an advertisement message from the second device 104 for, e.g., the application to which the first and second application identifiers correspond. Since the first device 102 is listening/monitoring for such an advertisement, the first device 102 is able to identify the second application identifier communicated in the second message and thus generates an alert upon detection.

Operation proceeds from step 914 to 916. In step 916 a communications connection, e.g., communication connection 124 shown in FIG. 1, is established with the second communications device that transmitted the second message. The communication connection 124 may be, e.g., an IP based connection. The operation proceeds from step 916 to step 918 wherein at least a portion of the stored portion of the first message is transmitted to the second communications device 104 over the established communications connection 124.

Thus, it should be appreciated that establishment of a communications connection, as well as transmission of signals and/or messages with higher payload from the first device 102 to the second device 104 occurs if the second message communicating the second application identifier is detected during the monitoring. If no such message is detected during the monitoring operation, the first device refrains from transmitting the stored first message or portion of the stored first message. Thus, it should be appreciated that unnecessary transmissions over the air link, of the first application identifier which is longer then the second application identifier, are avoided in this way. Operation proceeds from step 918 back to step 904.

For the above discussion it should be appreciated that numerous variations and embodiments are possible.

Figure 10:
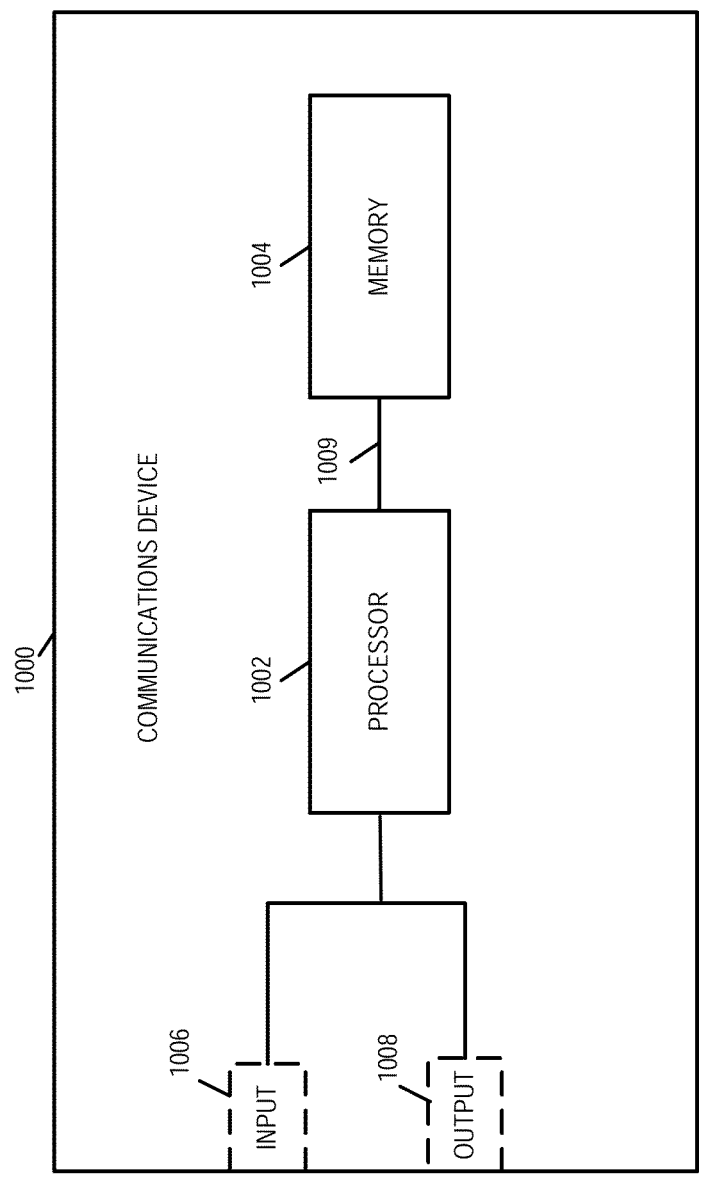
FIG. 10 illustrates another exemplary communications device which can be used in the system of FIG. 1.

FIG. 10 is a drawing of an exemplary communications device 1000 in accordance with one exemplary embodiment. Communications device 1000 maybe, and in at least one embodiments is, a mobile wireless terminal supporting peer to peer communications and implementing a method in accordance with flowchart 900 of FIG. 9. The communications device 1000 may be used as the first communication device 102 of FIG. 1. Communications device 1000 includes a processor 1002 and memory 1004 coupled together via a bus 1009 over which the various elements (1002, 1004) may interchange data and information. Communications device 1000 further includes an input module 1006 and an output module 1008 which may be coupled to the processor 1002 as shown. However, in some embodiments the input module and output module 1006, 1008 are located internal to the processor 1002. Input module 1006 can receive input signals. Input module 1006 can, and in some embodiments does, include a wireless receiver and/or a wired or optical input interface for receiving input. Output module 1008 may include, and in some embodiments does include, a wireless transmitter and/or a wired or optical output interface for transmitting output.

Processor 1002, in some embodiments, is configured to: receive a first message in a first format which is in accordance with a first communications protocol, said first message including a first application identifier corresponding to an application; store at least a portion of said first message; and monitor for a second message in a second format which is in accordance with a second communications protocol, said second message communicating a second application identifier corresponding to said application. In some but not necessarily all embodiments the processor 1002 is configured to generate the second application identifier from a portion of the first message prior to monitoring. In some embodiments the processor 1002 is further configured to perform at least one of a hash operation or a static mapping operation to generate the second application identifier from a portion of the first message. In at least one embodiment the processor 1002 is further configured to intercept communications between different protocol modules. In some embodiments, the processor 1002 is further configured to monitor for the second message during a predetermined time interval such as a discovery time interval during which peer, application or service identifiers may be transmitted.

The processor 1002 may and in some embodiments is, further configured to generate an alert when the second message is detected. In some embodiments the processor 1002 is further configured to establish a communications connection with a second communications device, e.g., second device 104, that transmitted the second message. In some embodiments the processor 1002 is further configured to transmit at least a portion of said stored portion of the first message to said second communications device 104 over said communications connection.

Figure 11:
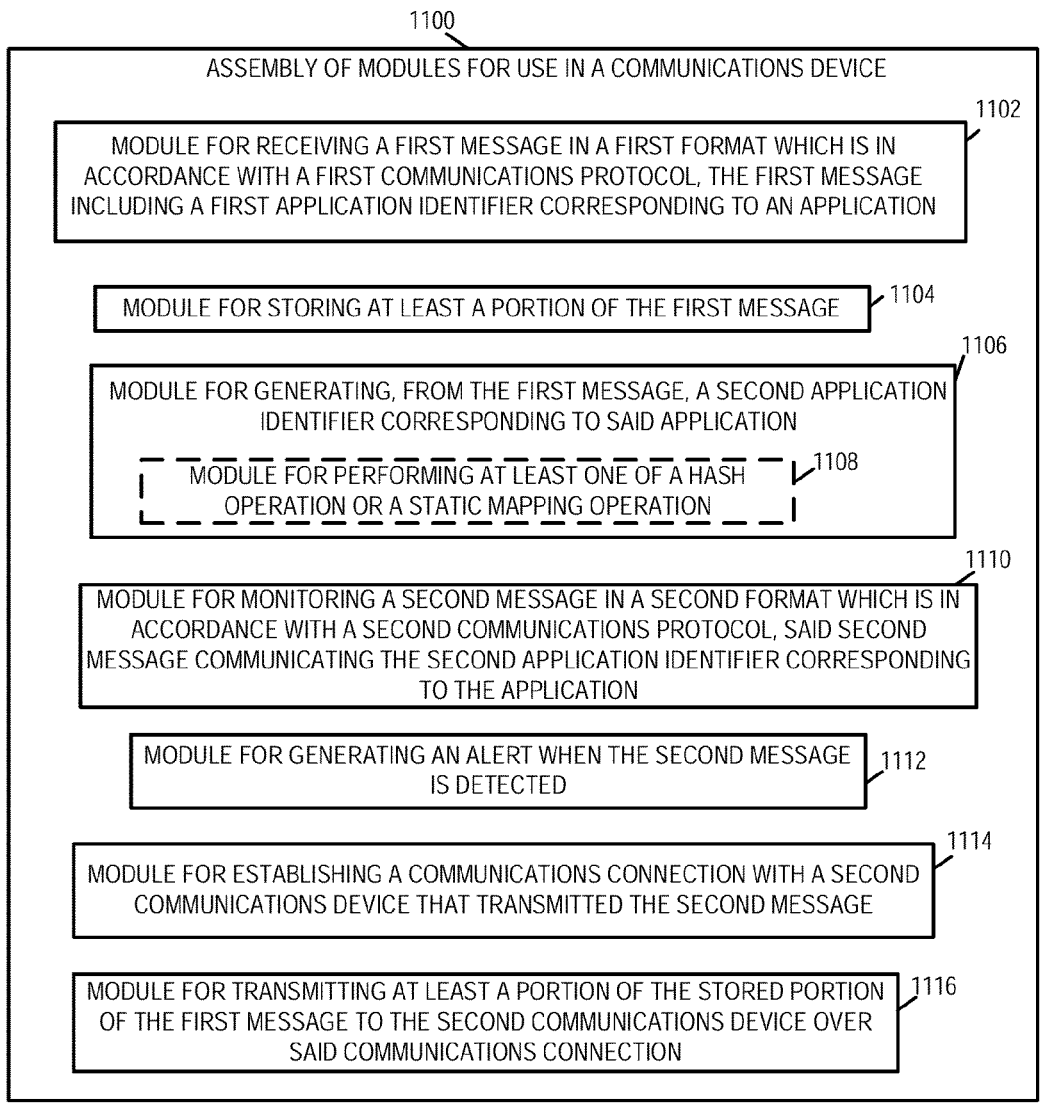
FIG. 11 illustrates an assembly of modules which can be used in the exemplary communications device of FIG. 10.

FIG. 11 is an assembly of modules 1100 which can, and in some embodiments are, used in the communications device 1000 illustrated in FIG. 10. The modules in the assembly 1000 can be implemented in hardware within the processor 1002 of FIG. 10, e.g., as individual circuits. Alternatively, the modules may be implemented in software and stored in the memory 1004 of the communications device 1000 shown in FIG. 10. While shown in the FIG. 10 embodiment as a single processor, e.g., computer, it should be appreciated that the processor 1002 may be implemented as one or more processors, e.g., computers.

When implemented in software the modules include code, which when executed by the processor 1002, configure the processor to implement the function corresponding to the module. In embodiments where the assembly of modules 1100 is stored in the memory 1004, the memory 1004 is a computer program product comprising a computer readable medium comprising code, e.g., individual code for each module, for causing at least one computer, e.g., processor 1002, to implement the functions to which the modules correspond.

Completely hardware based or completely software based modules may be used. However, it should be appreciated that any combination of software and hardware (e.g., circuit implemented) modules may be used to implement the functions. As should be appreciated, the modules illustrated in FIG. 11 control and/or configure the communications device 1000 or elements therein such as the processor 1002, to perform the functions of the corresponding steps illustrated in the method flow chart 900 of FIG. 9.

As illustrated in FIG. 11, the assembly of modules 1100 includes a module 1102 for receiving a first message in a first format which is in accordance with a first communications protocol, said first message including a first application identifier corresponding to an application, a module 1104 for storing at least a portion of said first message, a module 1106 for generating, from the first message, a second application identifier corresponding to said application. In some embodiments the module 1106 for generating the second application identifier also includes a module 1108 for performing at least one of a hash operation or static mapping operation. The hashing operation and/or static mapping operation may be performed on a portion of the first message to generate the second application identifier.

The assembly of modules 1100 further includes a module 1110 for monitoring a second message in a second format which is in accordance with a second communications protocol, said second message communicating the second application identifier corresponding to said application, a module 1112 for generating an alert when the second message is detected, a module 1114 for establishing a communications connection with a second communications device that transmitted the second message, and a module 1116 for transmitting at least a portion of the stored portion of the first message to the second communications device over the communications connection.

The techniques of various embodiments may be implemented using software, hardware and/or a combination of software and hardware. Various embodiments are directed to apparatus, e.g., mobile nodes such as mobile terminals, base stations, communications system. Various embodiments are also directed to methods, e.g., method of controlling and/or operating mobile nodes, base stations and/or communications systems, e.g., hosts. Various embodiments are also directed to machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments nodes described herein are implemented using one or more modules to perform the steps corresponding to one or more methods, for example, signal processing, message generation and/or transmission steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium including machine executable instructions for causing a machine, e.g., processor and associated hardware, to perform one or more of the steps of the above-described method(s). Some embodiments are directed to a device, e.g., communications node, including a processor configured to implement one, multiple or all of the steps of one or more methods of the invention.

In some embodiments, the processor or processors, e.g., CPUs, of one or more devices, e.g., communications nodes such as access nodes and/or wireless terminals, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a device, e.g., communications node, with a processor which includes a module corresponding to each of the steps of the various described methods performed by the device in which the processor is included. In some but not all embodiments a device, e.g., communications node, includes a module corresponding to each of the steps of the various described methods performed by the device in which the processor is included. The modules may be implemented using software and/or hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of controlling a communications device or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

The methods and apparatus of various embodiments are applicable to a wide range of communications systems including OFDM systems as well as many non-OFDM systems. The systems to which the described methods and apparatus can be applied include both cellular and peer to peer systems as well as other types of systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A communications method, the method comprising:
receiving, at a first communications device, a first message in a first format which is in accordance with a first communications protocol, said first message including a first application identifier corresponding to an application of the first communications device;
storing at least a portion of said first message including the first application identifier at the first communications device;
transmitting a second message from the first communications device to a second communications device in a second format which is in accordance with a second communications protocol, said second message communicating a second application identifier corresponding to said application, wherein the second application identifier is more concise than the first application identifier;
receiving, at the first communications device, a signal from the second communications device responsive to the second message, indicating an interest in the application; and
delaying transmission of the first application identifier to the second communications device at least until receiving the signal.

2. The communications method of claim 1, further comprising:
transmitting at least a portion of said stored portion of the first message to said second communications device including the first application identifier in the first format, in response to receiving the signal.

3. The communications method of claim 1, wherein said transmitting includes transmitting the second message during a discovery time interval.

4. The communications method of claim 1, wherein the first format is one of an mDNS format, a DNS-SD format, an UPnP format, and a SSDP format.

5. The method of claim 1, wherein receiving the first message comprises intercepting the first message at a proxy module and providing the second message to an airlink module, thereby bypassing intermediate modules between the proxy module and the airlink module.

6. The method of claim 1, further comprising generating the second application identifier having fewer bits than the first application identifier.

7. The method of claim 1, further comprising generating the second application identifier by hashing the first application identifier.

8. The method of claim 1, further comprising deferring establishment of a communications connection with the second communications device at least until receiving the signal.

9. The method of claim 8, further comprising supplying information lost as a result of generating the second message in the second format to the second communication device, via the communications connections.

10. The method of claim 1, wherein transmitting the second message is performed over a wireless peer-to-peer link.

11. A first communications device comprising:
at least one processor configured to:
receive a first message in a first format which is in accordance with a first communications protocol, said first message including a first application identifier corresponding to an application of the first communications device;
store at least a portion of said first message including the first application identifier; and
transmit a second message to a second communications device in a second format which is in accordance with a second communications protocol, said second message communicating a second application identifier corresponding to said application, wherein the second application identifier is more concise than the first application identifier;
receiving a signal from the second communications device responsive to the second message, indicating an interest in the application;
delaying transmission of the first application identifier to the second communications device at least until receiving the signal; and
a memory coupled to said at least one processor.

12. The first communications device of claim 11, wherein said at least one processor is further configured to:
transmit at least a portion of said stored portion of the first message to said second communications device including the first application identifier in the first format, in response to receiving the signal.

13. The first communications device of claim 11, wherein said transmitting includes transmitting the second message during a discovery time interval.

14. A first communications device comprising:
means for receiving a first message in a first format which is in accordance with a first communications protocol, said first message including a first application identifier corresponding to an application of the first communications device;
means for storing at least a portion of said first message including the first application identifier;
means for transmitting a second message to a second communications device in a second format which is in accordance with a second communications protocol, said second message communicating a second application identifier corresponding to said application, wherein the second application identifier is more concise than the first application identifier;
means for receiving a signal from the second communications device responsive to the second message, indicating an interest in the application; and
means for delaying transmission of the first application identifier to the second communications device at least until receiving the signal.

15. The communications device of claim 14, further comprising:

means for transmitting at least a portion of said stored portion of the first message to said second communications device including the first application identifier in the first format, in response to receiving the signal.

16. The communications device of claim 14, wherein said means for transmitting the second message includes means for transmitting the second message during a discovery time interval.

17. A non-transitory computer readable medium for use in a first communications device, comprising:
code for causing at least one computer to receive a first message in a first format which is in accordance with a first communications protocol, said first message including a first application identifier corresponding to an application of the at least one computer;
code for causing the at least one computer to store at least a portion of said first message including the first application identifier;
code for causing the at least one computer to transmit a second message to a second communications device in a second format which is in accordance with a second communications protocol, said second message communicating a second application identifier corresponding to said application, wherein the second application identifier is more concise than the first application identifier;
code for causing the at least one computer to receive a signal from the second communications device responsive to the second message, indicating an interest in the application; and
code for causing the at least one computer to delay transmission of the first application identifier to the second communications device at least until receiving the signal.

18. A communications method, the method comprising:
receiving, at a first communications device, a first message in a first format which is in accordance with a first communications protocol, said first message including a first application identifier corresponding to an application of the first communications device;
storing at least a portion of said first message including the first application identifier at the first communications device;
monitoring, at the first communications device, for a second message from a second communications device in a second format which is in accordance with a second communications protocol, said second message communicating a second application identifier corresponding to said application, wherein the second application identifier is more concise than the first application identifier; and
refraining from transmitting the first application identifier from the first communication device to the second communications device at least until the first communication device detects the second message communicating the second application identifier.

19. The communications method of claim 18, further comprising:
transmitting at least a portion of said stored portion of the first message to said second communications device including the first application identifier in the first format, in response to detecting the second message.

20. The communications method of claim 18, wherein the first format is one of an mDNS format, a DNS-SD format, an UPnP format, and a SSDP format.

21. The communications method of claim 18, wherein said first message is a search query message.

22. A first communications device comprising:
at least one processor configured to:
receive a first message in a first format which is in accordance with a first communications protocol, said first message including a first application identifier corresponding to an application of the first communications device;
store at least a portion of said first message including the first application identifier;
monitor for a second message from a second communications device in a second format which is in accordance with a second communications protocol, said second message communicating a second application identifier corresponding to said application, wherein the second application identifier is more concise than the first application identifier;
refraining from transmitting the first application identifier from the first communication device to the second communications device at least until detecting the second message communicating the second application identifier; and
a memory coupled to said at least one processor.

23. The first communications device of claim 22, wherein the at least one processor is further configured to:
transmit at least a portion of said stored portion of the first message to said second communications device including the first application identifier in the first format, in response to detecting the second message.

24. The first communications device of claim 22, wherein said first message is a search query message.

25. A first communications device comprising:
means for receiving a first message in a first format which is in accordance with a first communications protocol, said first message including a first application identifier corresponding to an application of the first communications device;
means for storing at least a portion of said first message including the first application identifier;
means for monitoring for a second message from a second communications device in a second format which is in accordance with a second communications protocol, said second message communicating a second application identifier corresponding to said application, wherein the second application identifier is more concise than the first application identifier; and
means for refraining from transmitting the first application identifier from the first communication device to the second communications device at least until detecting the second message communicating the second application identifier.

26. The first communications device of claim 25, further comprising:
means for transmitting at least a portion of said stored portion of the first message to said second communications device including the first application identifier in the first format, in response to detecting the second message.

27. The first communications device of claim 25, wherein said first message is a search query message.

28. A non-transitory computer readable medium for use in a first communications device, comprising:
code for causing at least one computer to receive a first message in a first format which is in accordance with a first communications protocol, said first message including a first application identifier corresponding to an application of the first communications device;

code for causing the at least one computer to store at least a portion of said first message including the first application identifier;

code for causing the at least one computer to monitor for a second message from a second communications device in a second format which is in accordance with a second communications protocol, said second message communicating a second application identifier corresponding to said application, wherein the second application identifier is more concise than the first application identifier; and code for refraining from transmitting the first application identifier from the first communication device to the second communications device at least until detecting the second message communicating the second application identifier.

* * * * *